United States Patent
Gowder

(10) Patent No.: US 8,350,156 B2
(45) Date of Patent: *Jan. 8, 2013

(54) NAIL DEFLECTOR

(76) Inventor: Phillip H. Gowder, Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,387

(22) Filed: Jul. 11, 2011

(65) Prior Publication Data

US 2011/0287278 A1 Nov. 24, 2011

Related U.S. Application Data

(63) Continuation-in-part of application No. 12/660,756, filed on Sep. 21, 2009, now Pat. No. 7,977,576.

(51) Int. Cl.
*H01B 7/00* (2006.01)
*H02G 3/34* (2006.01)

(52) U.S. Cl. ........ 174/135; 174/507; 174/650; 138/110; 248/68.1

(58) Field of Classification Search ................ 174/68.1, 174/68.3, 72 A, 507, 36, 135, 35 R, 650, 174/662, 664, 665; 248/65, 68.1, 56, 74.3, 248/71; 439/583, 581; 16/2.1, 2.2; 138/110, 106; 137/359

See application file for complete search history.

(56) References Cited

U.S. PATENT DOCUMENTS

| | | |
|---|---|---|
| 1,818,625 A | 8/1931 | Hunter |
| 2,317,825 A | 4/1943 | Teas |
| 2,870,242 A | 1/1959 | Wilkerson |
| 3,240,869 A | 3/1966 | Jureit |
| 3,515,797 A | 6/1970 | Hochstetler |
| 4,807,417 A | 2/1989 | Bell |
| 7,071,410 B1 | 7/2006 | Kiely |
| 7,601,918 B2 | 10/2009 | Pamperin |
| 7,977,576 B1 | 7/2011 | Gowder |

*Primary Examiner* — Angel R Estrada

(74) *Attorney, Agent, or Firm* — Schneck & Schneck; Thomas Schneck

(57) ABSTRACT

An improved pipe and utility protector comprising a rectangular piece of material composition featuring a down piece having a V-shaped cross-section along a longitudinal centerline, including an angular transition, to an offset mounting flange protruding slightly outward from the crest of the curved V-shape for attaching the embodiment to framing members. The flanges allow pieces to be attached together, joining framing members horizontally, vertically and at various angles throughout structures.

5 Claims, 4 Drawing Sheets

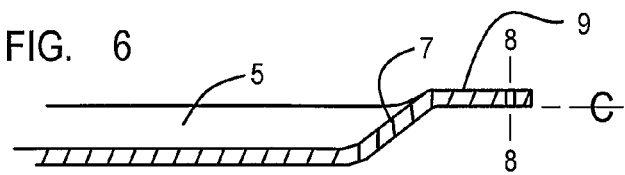
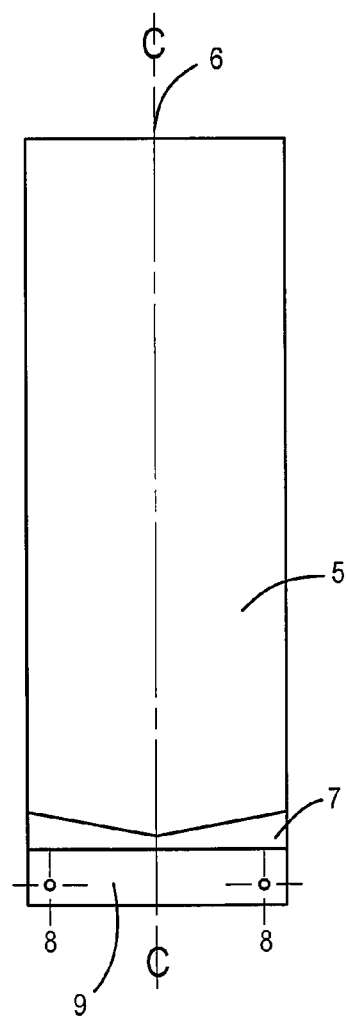
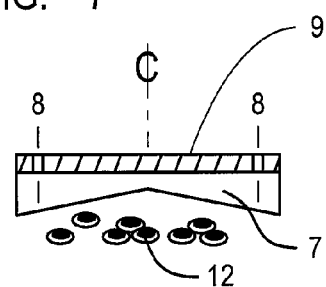
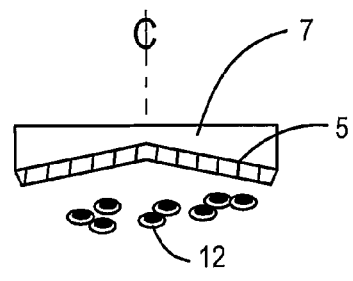

180°

180°

90°

90°

90°

NAIL DEFLECTOR

CROSS REFERENCE TO RELATED APPLICATION

This application is a continuation-in-part of application Ser. No. 12/660,756, filed Sep. 21, 2009, now issued as U.S. Pat. No. 7,977,576.

BACKGROUND OF THE INVENTION

This application relates to the protection of metal, plastic plumbing pipes, and electrical wires routed though framing members.

PRIOR ART

U.S. Pat. No. 7,071,410 to Kiely discloses an elongated strip of metal, which comprises an arcuately curved section in combination with at least one flange extending outwardly from the curved section. The device is designed to shield non-metallic electrical power caring cable, is capable of being completely surrounded by a protective shield which is affixed directly to any support wall, such as a concrete or cinderblock wall. The overall lengths ranging between 2 feet and 4 feet.

The protective apparatus is apparently designed to mount to one side of a given cement block wall. The fact that it is u-shaped suggests that the device primarily shields against puncture from one direction. The concrete or cinderblock protects from puncture from the opposite side. In such a scenario a nail could not be easily driven into a utility that was shielded by the current device.

SUMMARY OF THE INVENTION

The invention is a nail deflector formed as an elongated rectangular metal piece having an angular transition to at least one offset mounting flange that features two holes for mounting purposes. Two similar parts on opposite sides of pipes can form one functional device. Each piece has a V-shaped cross section and terminates at each end in a protruding offset mounting flange. The two flanges attach to framing members. Two pieces can surround pipes or utilities and be fused together to provide complete protection as a single functional part.

An advantage to this new design is that it easily attaches to the face of framing members on either, or both sides of a given wall. Thus the device can protect said pipes and utilities from puncture from exterior siding fasteners, or interior finish wallboard or other fasteners. The device is designed to be applied to the face(s) of framing member's, wooden, metal or other material in as many parts necessary to provide protection against punctures caused by fasteners being driven into wall coverings at a right angle.

Furthermore the device is designed to be installed in an overlapping telescopic fashion. This feature allows the device to be easily adjusted to meet most job site conditions and requirements. Also the device can be cut to varying lengths and applied throughout given structures onto floor joists, ceiling joists, wall plates and the like as needed within its limitations.

The device can also be fastened to itself at right angles (T-intersections) and at varying angles. Thus the device offers an additional level of protection.

220 volt electrical service panels are no longer allowed in closets in some locations. The law requires panels to be located within dwellings where they can be easily seen and accessed. This leaves them exposed in a room or hallway. They are usually unsightly and occupants tend to want to hide them, by hanging something over them. This raises the odds of persons driving nails, screws, or fasteners into and through the wallboard directly into the zone where wires are usually located within the walls and connected to the panel.

Thus the occupant is exposed to possible harm from electrical shock, or even causing an arc, or spark and starting a fire within a wall. This new device is designed to prevent such events from ever occurring.

Also the device can be manufactured in varying widths to protect plumbing/electrical wires and utilities routed though walls framed 3" to 24" on center. This also allows the device to shield wires running to and from the electrical service panels.

The device can be attached to itself horizontally, vertically or at right angles and varying angles in multiple directions. Thus offers even another level of protection for pipe, wires and utilities where they join at angles.

This new device can also span fire blocking where pipes, wires and utilities are routed through them. This is possible because of its method of attachment to the face of framing members.

As an example, common interior walls sometimes have pipe(s) routed vertically. This new device could be installed on each side of the wall. The pipe would be shielded from puncture from both sides. Thus this new device provides an unequalled level of protection against puncture/disruption of plumbing, or other service lines.

My new device is not limited to one side of walls. It is designed to protect pipes, wires and utilities located in a variety of places such as floors, ceilings and walls.

My new device is capable of protecting pipes, wires, and other run lines for up to the entirety of their run throughout structures.

My invention could be used for example to shield high voltage wires routed though walls and schedule 80 plastic pipe which is often installed from below grade up into service panels between walls. These service lines pose the threat of electrical shock to occupant(s) or workers. There is also a threat of damage to electrical system.

There is a situation of nails/fasteners being driven into and thus puncturing waterlines that run throughout walls thereby causing immediate, or slow water damage. My invention can significantly reduce the odds of pipes being punctured by occupant(s)/workers(s) and this reduces the chances of mold. In summary, the advantages of my new device are that its employment can save money as it can prevent unnecessary repairs and more importantly the device can enhance health, safety and well being to service personnel and occupants alike.

Example: A worker or occupant of a dwelling desires to mount something such as a picture or plywood sheathing on a given interior or exterior wall of a structure. This may requires a nail or other fastener being driven into and through said finished wallboard.

The person has by chance chosen a location of a pipe hidden behind said wallboard that has my inventive device installed shielding the pipe.

He/she proceeds to drive a nail through the wallboard. My inventive device deflects, or stops the nail, screw, or other object before any damage can be caused to the pipe(s) or wire(s) or others utilities hidden in the wall.

As a result he/she proceeds to move to a different area of the wall to hang the picture without damaging unseen pipes other systems within the wall.

BRIEF DESCRIPTION OF THE DRAWINGS

FIG. 5 is a front or partial thereof.

FIG. 6 is a partial lengthwise cutaway of a wider broader device embodiment.

FIG. 7 is a bottom sectional view thereof.

FIG. 8 is another bottom sectional view of at another location.

DETAILED DESCRIPTION OF THE INVENTION

Figure 1:
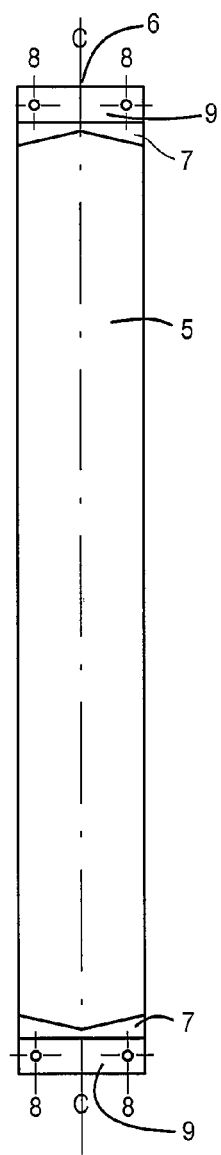
FIG. 1 is a front view of my new device.
Figure 2:
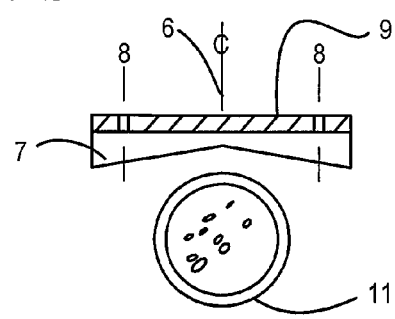
FIG. 2 is a top end view from a mounting flange.
Figure 3:
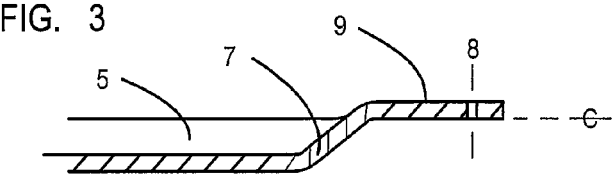
FIG. 3 is a partial lengthwise cutaway view featuring offset mounting flange.
Figure 4:
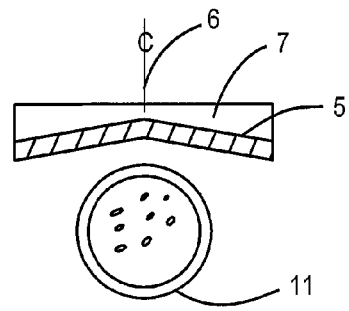
FIG. 4 is bottom sectional view thereof.
Figure 9:
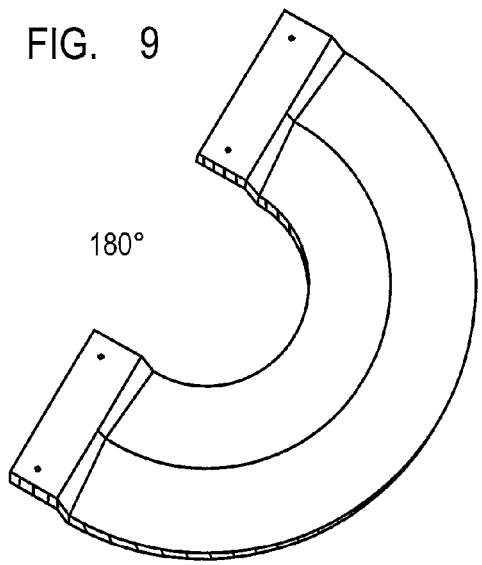
FIG. 9 is a perspective view of an alternate embodiment showing a U-shaped 180 degree protector in which both ends can be attached to framing members.
Figure 10:
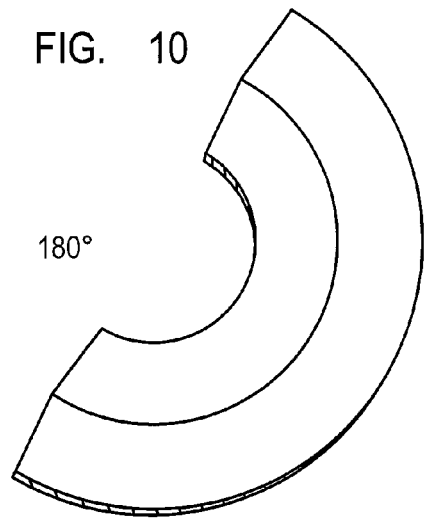
FIG. 10 is a view of a U-shaped 180 degree protector device in which both ends would fasten to the curved V-shaped end of the device of FIG. 1.
Figure 11:
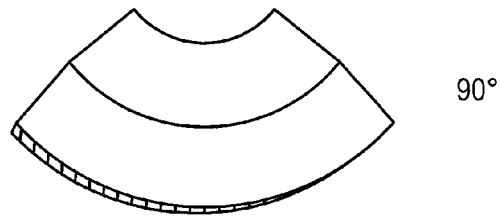
FIG. 11 is a view of right or left corner device with 90 degrees protection which fastens to the curved V-shaped end of the device of FIG. 1.
Figure 12:
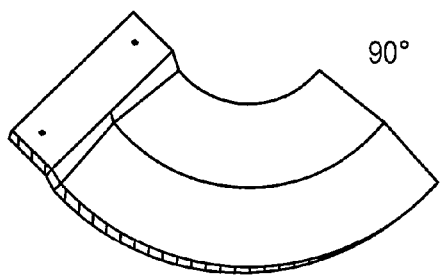
FIG. 12 is a view of a left hand corner with flat flanged area that attaches to framing members and to the curved V-shaped end of the device of FIG. 1.
Figure 13:
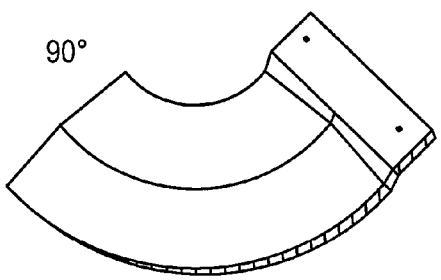
FIG. 13 is a view of a right hand corner with a flat flanged area that attaches to framing members and to the curved V-shaped end of the device of FIG. 1.

With reference to the Figures, a rectangular piece of 16 gage metal, 58 inches length and 6 inches in width is stamped between two dies forming a valley. This results in a device featuring a V-shape cross-section that is ¾ of an inch in depth at the centerline 6 of its valley. In the longitudinal direction there is a curved V shape transition 7, that is an angular transition to a flat flange 9, that is offset and protruding 0.077 inches past the crest of the longitudinal lateral centerline, terminating in a flat mounting area. The mounting area is 4½ inches in length prior to the very end of the device, and 6 inches in width, resulting in a flange that protrudes outwardly past the peak of V-shaped curve, a flat flanged area. This provides a mount, with two holes 8, each ¾" in from each furthest most corner and the bottom end of the flanged end of the device, serving as mounting holes drilled 0.177 inches.

The holes are to attach the device to the face of framing member(s). An embodiment is disclosed that can be easily manufactured in varying lengths, and widths that can be attached to itself. The apparatus can be attached to framing members horizontally, vertically, at a right angle, also at various angles.

First Embodiment

Vertical installation: From either side of the wall floor or ceiling. The end user can/will measure the inside dimensions of framing members. Place two pieces of the device in a straight line with offset flanges at opposite ends. Add the depth 10 of the flange members to the inside measurement of the framing faces. Then fasten the center overlapping zone together with tape and screws as follows; The center middle span of the two pieces shall overlap. Flashing tape shall be wrapped around both edges at the edge of the terminating end of each section where the device is double thickness. Holes shall be predrilled in through both pieces in the double thickness zone. Four self-tapping screws shall be used to fasten the pieces together. The device could then be put into place over the centerline of pipes, wire or other systems. The device would then be further attached to the framing members with fasteners driven through predrilled holes in offset mounting flanges via self tapping screws driven into said framing members.

Horizontally. The device also installs in wall applications from framing stud to framing stud or from beam to beam over said pipes, wiring centerline and attaches to said framing in the same manner to framing members as above.

Horizontal to Vertical installation: This is used where two pieces intersect one part of the device installed horizontally and intersecting with a previously vertically installed unit of the device. The offset flange of the horizontal section of the device shall overlap the linear edge of the vertically installed section and be temporally taped in place. Then two pilot holes shall be carefully drilled through the holes in the offset flange of the horizontal piece into the vertical piece of the device behind it. Then the two parts shall be fastened together, with two self-tapping screws. Attach the device over the centerline of pipes, wires, or other utilities. Caution must be used to ensure that no harm to pipe(s), wire(s) occurs during installation of the device.

Diagonal connections to Horizontally, Vertically, or Diagonally run sections: The device can be connected to itself at angles simply by cutting miters on the device at nearly any point of a given run between framing members. Or by simply cutting either end of the curved V-section, or at the offset mounting flange. Then overlapping them and temporally taping them together. This is followed by pre-drilling and setting them together with screws. Where the curved V shaped ends meet at mitered points they shall be braced by plumbers straps secured to studs. Flashing tape shall be placed over the top of the device and strap to secure it into place.

In cases of the device being installed in taller walls over eight foot tall third, fourth, and so on extensions can be easily made by cutting off the angular transition, and removing the offset mounting flange.

When two or more sections are installed they shall be secured together in an overlapping zone. There shall be four pre-drilled holes located inward from sides and ends of each section of the device in the overlapping zone. Then four self-tapping screws shall be set into each overlapping zone of the devices.

Metal plumbing straps shall be placed over the face of the device and attached to framing members at the middle point of each overlapping connection. The straps shall then be anchored to the framing members and a piece of flashing-tape applied vertically to the device over the attached plumbing strap.

In the case where the device is applied to metal framing members it may be fastened to framing members with self-tapping screws.

In the event the device is applied to steel construction it may be fastened to framing members with suitable welds to secure it in place to the structure. This method of installation is recommended only to be performed by a qualified professional.

Bat type Insulation in a wall, floor or ceiling shall be split down its center and placed between the pipe and the inside back surface of the device within a stud bay or other cavity.

In any of the above installations there shall be a bead of silicone run down the ridge of the device and allowed to fully cure prior to wall covering. The silicone bead shall terminate prior to any end of any offset mounting flange. All applications of the device shall be covered with wallboard or any other industry standard wall finish material(s).

In any of the above installations the device shall be centered over the centerline of pipes, wires or other utilities, as they must rest fully behind its cover.

An embodiment is a rectangular piece of 16 gage metal 58" to 72" in length and 14" to 21" in width, although could be made larger, or smaller. The piece is stamped between two dies, resulting in the device featuring a V-shape cross section that is 1¼" inches in depth at the highest point of the crown down its longitudinal centerline. An angular transition terminates the piece into a flange that is offset past the longitudinal lateral centerline. A flat mounting area, 4" in length, just prior to the very end of the device, results in a flat flange area that protrudes slightly outward from the peak of V-shaped curve area thus providing a mount, with two holes ¾" in from each furthest most edge of the flat flanged end of the device. Another embodiment has the same features as above, although a length between 94" and 144" with flanges having the same features as above although on both end of the device.

Another embodiment is a piece of 16 gage sheet metal 92 or 144 inches long, having a width of 5 or 7 inches featuring two offset mounting flanges one at each end of the device.

Advantages

The inventive device can protect and shield pipes, wires and others utilities from fastener intrusions form multiple directions within a building envelope, depending on how it is employed.

It can also shield pipes, and utilities for up 100% of their run within the habitable and non-habitable area of a building to which it is applied.

The device is easy to manufacture, handle and simple to install.

The device is purposed to protect pipes wires and utilities within walls, floors and ceilings.

The device drastically reduces the odds of a person(s) being shocked, electrocuted, and electrical arks from occurring. Thus the device reduces the odd of fires starting within walls. Thus the device enhances health and safety to occupants.

The device can save time and money by cutting down, or eliminating unnecessary expensive repairs.

Installation of this new device can reduce the odds of water, power, or other systems being shut down especially in multiple dwelling units, reducing inconvenience to occupants.

The device highly reduces the likelihood of fast or slow water leaks from developing. In the situation of a punctured water line that can go undetected for some time, the device reduces the possibility of the proliferation of mold.

Telescoping Embodiment

Figure 14:
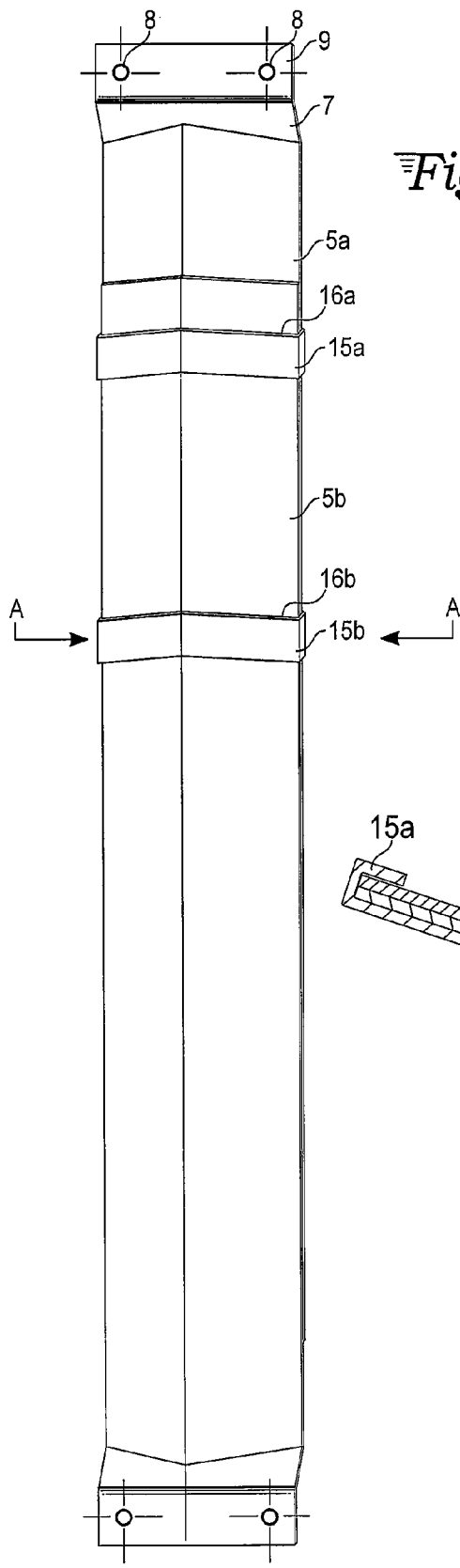
FIG. 14 is a front view of a telescoping embodiment of the nail resistant protection device.
Figure 15:
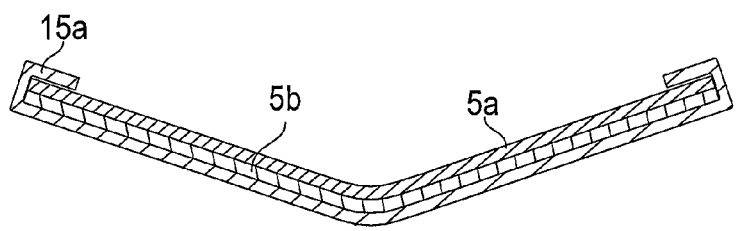
FIG. 15 is a cross section of the FIG. 14 along arrows A-A.

In FIG. 14, a telescoping embodiment is shown. This embodiment includes a first elongate metal section 5a and a second elongate metal section 5b. As in the prior embodiments, this section has an end flange 9 that is attachable to a framing member (e.g. horizontal framing lumber) by a fastener, such as nails driven through holes 8 and secured into the horizontal framing member. As before a curved transition section 7 extends between the end flange 9 and the first elongate metal section 5. In this embodiment, the opposite end of the first elongate metal section does not have a second flange and instead ends in a simple cross sectional cut through the elongate metal section, resulting in a V-shaped end. A second elongate member 5b also has a similar structure: an end flange, a transition and an elongate body. Mounted onto a face of the elongate body is a plurality of clips 15a, 15b. These are attached to the face of elongate body 5b by attachment means 16a, 16b, respectively. These attachment means may be spot welds, tape, adhesive, or other attachment means. These clips have a have that extends across the width of the elongate metal section 5b and conforms to the shape of elongate metal section. On the sides of the clip, arms on each end of the face side extend across the thickness of two of the elongate metal sections. This is shown in FIG. 15. Each arm terminates in a clip flange that is parallel with the clip face. This allows the two elongate sections to be slideably moved in relation to each other. One end may be fastened onto a horizontal framing member. The other elongate section can then be slid with relation to the fastened section until the end flange of the second section is in position to be nailed into a second section. As before, this device will defect nails from plastic pipe, electrical or other wiring, or other structure that requires protection.

What is claimed is:

1. A nail deflector for shielding an elongate structure within internal framing members of a wall, the deflector comprising:
   an elongated metal shield body having a V-shaped cross section and a lengthwise crest;
   an end flange section attachable by fasteners to a framing member face, the lengthwise crest terminating at an end of its length at the end flange section; and
   a curved angular piece forming a transition between the end flange and the elongated metal shield body.

2. The nail deflector of claim 1, further including; a second elongated metal shield body having a V-shaped cross section and a lengthwise crest;
   a second end flange section attachable by fasteners to a second framing member face;
   a second curved angular piece forming a transition between the second end flange and the second elongated metal shield body; and
   a plurality of spaced clips attached to second metal shield, each of said clips having a clip face extending across and conforming in shape to the V-shaped cross section and having arms extending a thickness of both first and second metal shield, each of said clips having also having two short terminal flanges parallel to the clip face and separated from the clip face by the arms which are substantially perpendicular to the clip face and the terminal flanges, wherein said clips allow the elongated metal shield body and the second elongated shield body to be joined in slidable relation.

3. The nail deflector of claim 2, wherein said plurality of spaced clips are attached to the second elongated metal shield body by welding.

4. The nail deflector of claim 2, wherein said plurality of spaced clips are attached to the second elongated metal shield body by tape.

5. The nail deflector of claim 2, wherein said plurality of spaced clips are attachable to the second elongated metal shield body by adhesive.

* * * * *